Patented Mar. 4, 1952

2,587,580

UNITED STATES PATENT OFFICE 2,587,580

METHOD OF PREPARING CARBOTHIOLIC ACIDS

John C. McCool, Akron, Ohio, assignor to The B. F. Goodrich Company, New York, N. Y., a corporation of New York No Drawing. Application June 3, 1949, Serial No. 97,082

4 Claims. (Cl. 260—500)

This invention relates to the preparation of carbothiolic acids (thiol acids) and more specifically pertains to a method of preparing carbothiolic acids by reacting organic diacyl oxides (carboxylic acid anhydrides) and diacyl sulfides with hydrogen sulfide in the presence of a new class of catalysts for this reaction.

Heretofore, acetic anhydride has been reacted with hydrogen sulfide in the presence of various catalysts to form thiolacetic acid. Acetyl chloride, zinc chloride, hydrochloric acid, sulfuric acid and other acidic materials have been employed as catalysts for this reaction but, in general, the resulting reactions have been very slow and/or have produced thiolacetic acid in very low yield.

The general object of this invention is to provide an economically feasible industrial process for the preparation of carbothiolic acids. Another object, which is more specific, is the preparation of thiolacetic acid in high yields.

I have discovered that the objects of this invention can be accomplished by reacting a diacyl oxide or a diacyl sulfide with hydrogen sulfide in the presence of an organic sulfonic acid. Both the diacyl oxides and the diacyl sulfides are members of the class of compounds which contain a divalent atom of a chalcogen element occurring in one of the short periods of the periodic table, said atom having each of its valences attached to a carbonyl group and being otherwise composed of carbon and hydrogen atoms.

In following the method of my invention, it is preferred to carry out the reaction at elevated pressure employing an autoclave as a reactor. The autoclave may be of any standard design capable of withstanding internal working pressures up to about 5000 pounds per square inch. The autoclave should have a stirrer, a port for charging the reactants at atmospheric pressure, a line for charging the hydrogen sulfide under pressure, a means for heating and cooling the reaction mixture, and a means for controlling the reaction temperature. The diacyl oxide or diacyl sulfide is charged together with the organic sulfonic acid catalyst. The amount of catalyst is preferably 1% to 3% based on the diacyl oxide or diacyl sulfide but more or less may be employed if desired. The autoclave is then closed and hydrogen sulfide at full pressure from a weighed cylinder is admitted into the reactor while the materials therein are stirred until the internal pressure is about 250 pounds per square inch at room temperature which in most all cases will provide an amount of hydrogen sulfide in excess of the stoichiometric proportion required for the reaction. The reaction may be carried out at room temperature as long as the exothermic reaction takes place or may be carried out more rapidly at elevated temperatures. During the progress of the reaction, a total amount of hydrogen sulfide slightly in excess of the theoretical amount necessary for the reaction is taken up, the excess being dissolved in the reaction mixture. When the consumption of hydrogen sulfide has ceased, the unreacted hydrogen sulfide is removed from the reactor and the carbothiolic acid formed during the reaction can be recovered by first stripping the reaction mixture at reduced pressure and then fractionating the stripped crude. Another method of recovery involves distilling the crude reaction mixture to separate the crude carbothiolic acid containing some of the corresponding carboxylic acid from the reaction mixture and then fractionating the crude carbothiolic acid mixture to recover the pure carbothiolic acid. Still other methods of recovery of the desired carbothiolic acid depending on the nature of the product can be employed where desired.

Although it is preferred to employ elevated temperatures, i. e., 50° to 100° C., and corresponding elevated pressures, the process may be carried out at atmospheric pressure and at lower temperatures, i. e., about 25° to 50° C. Under the latter conditions the reaction is relatively slow.

The following examples, in which the parts are by weight, illustrate specific methods of carrying out my invention.

EXAMPLE I 400 parts of acetic anhydride of 95% purity (3.72 moles) and 8 parts of para-toluene sulfonic acid hydrate were charged into an autoclave. The autoclave was then sealed and hydrogen sulfide was charged to the autoclave from a weighed cylinder at full cylinder pressure while the reactants were agitated. In this manner 363 parts (10 moles) of hydrogen sulfide were added and the internal pressure was 250 pounds per square inch. The reactants were then heated to 98° C. and stirred. After 3½ hours the unreacted and undissolved hydrogen sulfide was removed from the autoclave, and the liquid materials remaining in the autoclave were removed and distilled using a Vigreaux column. The fraction boiling in the range of 88° C. to 115° C. was collected and transferred to a still containing an adiabatic column and redistilled. In this manner there was recovered 226.4 parts of a material boiling between 85.5° C. and 88° C., and identified as thiolacetic acid. The recovered thiolacetic acid represents a yield of 80% of the theoretical.

EXAMPLE II

The same quantities of acetic anhydried, para-toluene sulfonic acid and hydrogen sulfide as employed in Example I were charged into an autoclave. Again the initial internal pressure was 250 pounds per square inch. In this preparation the reactants were agitated and maintained at a temperature of 90° C. for 3½ hours. In this manner a yield of thiolacetic acid of 80% of the theoretical was also obtained.

EXAMPLE III

In other preparations of thiolacetic acid at different temperatures and pressures the folllowing results were obtained. When 400 parts of acetic anhydride of 95% purity and 8 parts of para-toluene sulfonic acid were employed and hydrogen sulfide was bubbled into these materials at atmospheric pressure and room temperature for a period of 3½ hours, a yield of thiolacetic acid of 28% of theoretical was obtained. Where 400 parts of acetic anhydride of 95% purity and 8 parts of para-toluene sulfonic acid were charged in an autoclave, saturated with 363 parts of hydrogen sulfide at 250 pounds per square inch and the reaction was carried out at this pressure and at room temperature, a yield of thiolacetic acid of 45% was obtained in 3½ hours.

The results obtained in the preceding examples are to be compared with the results obtained using other acidic materials as catalysts for the reaction of acetic anhydride and hydrogen sulfide. The table lists results with other catalysts showing the catalyst employed, the initial pressure before heating the reactants, the reaction temperature, and the yield of thiolacetic acid recovered. In each case 400 parts of acetic anhydride of 95% purity and 363 parts of hydrogen sulfide were allowed to react for 3½ hours.

*Table*

| Catalyst | Initial H₂S pressure, pounds per square inch | Temperature °C. | Yield Per cent |
|---|---|---|---|
| Benzoyl peroxide | 250 | 90 | 17 |
| Acetyl chloride | 250 | 90 | 15 |
| Zinc chloride | 250 | 90 | 21 |
| Ferric chloride | 250 | 90 | 45 |

From a comparison of the yields of thiolacetic acid in the table with the yield of thiolacetic acid in Example II of 80% where the temperature and pressure conditions of the reactions were the same, it is quite obvious that by employing the method of this invention much superior yields of thiolacetic acid are obtained. Thus, the organic sulfonic acids as catalysts for the reaction of hydrogen sulfide with a diacyl oxide or diacyl sulfide are superior to the acid catalysts heretofore known.

Any of the organic mono-sulfonic acids having an organic hydrocarbon radical attached to a —SO₃H group can be used as catalyst in carrying out this invention. For example, sulfonic acids having an alkyl group attached to the —SO₃H group such as methyl sulfonic acid, ethyl sulfonic acid, propyl sulfonic acid, isopropyl sulfonic acid, the butyl sulfonic acids, the pentyl sulfonic acids, the dodecyl sulfonic acids and the like; such sulfonic acids containing an alkenyl group as allyl and methallyl sulfonic acids and the like; such sulfonic acids containing an alicyclic group as cyclohexyl sulfonic acid, methyl cyclohexyl sulfonic acids, ethyl cyclohexyl sulfonic acids, and the like; and such sulfonic acids containing an aryl group or a hydrocarbon substituted aryl group as benzene sulfonic acid, the toluene sulfonic acids, the xylenesulfonic acids, the biphenyl sulfonic acids, the naphthalene sulfonic acids and the like may all be used as catalysts. All these sulfonic acids possess the structure R—SO₃H where R is a hydrocarbon radical containing from 1 to 12 carbon atoms.

Any unsubstituted diacyl oxide or unsubstituted diacyl sulfide can be reacted with hydrogen sulfide to form a carbothiolic acid, according to the process of this invention as hereinbefore described. In addition to acetic anhydride, diacyl oxides having the same or different hydrocarbon groups attached to the two carboxyl groups may be employed. Examples of other diacyl oxides which may be employed include propionic anhydride; butyric anhydride; valeric anhydride; caproic anhydride; heptylic anhydride; caprylic anhydride; lauric anhydride; cyclohexaneacetic anhydride; alpha ethyl cyclohexane acetic anhydride; cyclopentanetridecanoic anhydride; the anhydride of acetic acid with butyric acid; the anhydride of butyric acid with propionic acid; cyclohexanecarboxylic acid anhydride; cyclobutanecarboxylic acid anhydride; ortho-, para- and meta-methyl cyclohexanecarboxylic acid anhydrides; benzoic anhydride; ortho-, meta- and para-toluic anhydride; alpha naphthoic anhydride and beta naphthoic anhydride.

In addition, there may be employed diacyl oxides which contain a divalent hydrocarbon group having each of its valences satisfied by a carbonyl group which in turn is attached to an oxygen atom. Examples of such diacyl oxides include malonic anhydride, maleic anhydride, succinic anhydride, glutaric anhydride, adipic anhydride, pimelic anhydride, suberic anhydride, azelaic anhydride, sebacic anhydride, brassylic anhydride, thapsic anhydride, alpha, beta-diethyl succinic anhydride, 1,2-cyclohexanedicarboxylic anhydride (hexahydrophthalic anhydride), 1,2-cyclobutanedicarboxylic anhydride (ethylene succinic anhydride), phthalic anhydride, diphenic anhydride, 1,2-naphthalenedicarboxylic anhydride, and 1,8-naphthalenedicarboxylic anhydride.

In addition to acetic anhydrosulfide, the diacyl sulfide corresponding to acetic anhydride, any of the diacyl sulfides corresponding to the acidic anhydrides named above, can be employed as reactants with hydrogen sulfide in the process of this invention for preparing carbothiolic acids.

The carbothiolic acids or thioacids produced by the method of this invention are useful in the synthesis of organic sulfur compounds especially thio esters which are prepared by reacting a carbothiolic acid with an unsaturated compound. From these thio esters many useful thiols can be prepared. In addition the carbothiolic acids find use in analytical chemistry.

Although I have disclosed specific examples of the practice of my invention, I do not thereby desire or intend to limit myself solely thereto for, as hitherto stated, the amount of reactants employed may be varied and chemical equivalents may be employed, if desired, without departing from the spirit and scope of this invention as defined in the appended claims.

I claim:

1. A process for the preparation of thiolacetic acid which comprises reacting acetic anhydride with hydrogen sulfide in the presence of an organic mono-sulfonic acid of the structure R—$SO_3H$ wherein R is a hydrocarbon radical containing 1 to 12 carbon atoms and recovering the thiolacetic acid.

2. A process for the preparation of thiolacetic acid which comprises reacting acetic anhydride with hydrogen sulfide in the presence of an aryl mono-sulfonic acid of the structure $R_1$—$SO_3H$ wherein $R_1$ is an aryl hydrocarbon radical containing 6 to 12 carbon atoms and recovering the thiolacetic acid.

3. A process for the preparation of thiolacetic acid which comprises reacting acetic anhydride with hydrogen sulfide in the presence of para-toluene sulfonic acid and recovering the thiolacetic acid.

4. A process for the preparation of a carbothiolic acid which comprises reacting hydrogen sulfide with a compound containing a bivalent atom of a chalcogen element occurring in one of the short periods of the periodic table, having each of the valences of said atom attached to a carbonyl group and being otherwise composed of carbon and hydrogen atoms in the presence of an organic mono-sulfonic acid of the structure R—$SO_3H$ wherein R is a hydrocarbon radical containing 1 to 12 carbon atoms and recovering the carbothiolic acid.

JOHN C. McCOOL.

REFERENCES CITED

The following references are of record in the file of this patent:

UNITED STATES PATENTS

| Number | Name | Date |
| --- | --- | --- |
| 2,412,036 | Ellingboe | Dec. 3, 1946 |

OTHER REFERENCES

Journal Am. Chem. Soc., vol. 46 (1924), pp. 1731–1733.

Binz: Berichte der Deutschen Chemischen Gesellschaft, vol. 53, p. 2021.

Jacquemin: Beilstein, vol. 2 (original), p. 230.